United States Patent [19]

Odawara et al.

[11] Patent Number: 5,734,918
[45] Date of Patent: Mar. 31, 1998

[54] COMPUTER SYSTEM WITH AN INPUT/OUTPUT PROCESSOR WHICH ENABLES DIRECT FILE TRANSFERS BETWEEN A STORAGE MEDIUM AND A NETWORK

[75] Inventors: Hiroaki Odawara, Menlo Park, Calif.; Moritoshi Yasunaga, Tsukuba; Kazunori Kuriyama, Iruma-gun, both of Japan

[73] Assignee: Hitachi, Ltd., Tokyo, Japan

[21] Appl. No.: 504,600

[22] Filed: Jul. 20, 1995

[30] Foreign Application Priority Data

Jul. 26, 1994 [JP] Japan ................... 6-193630

[51] Int. Cl.$^6$ .................................... G06F 15/20
[52] U.S. Cl. .................. 395/800.01; 395/200.27; 395/851; 395/894; 364/238.2; 364/DIG. 1
[58] Field of Search ............... 395/800, 800.01, 395/200.47, 851, 894; 364/DIG. 1, 238.2

[56] References Cited

U.S. PATENT DOCUMENTS

| 4,677,609 | 6/1987 | Piereth et al. ................... 370/60 |
| 5,170,466 | 12/1992 | Rogan et al. ................... 395/145 |
| 5,390,170 | 2/1995 | Swant et al. ................... 370/58.1 |
| 5,459,720 | 10/1995 | Iliev et al. ................... 370/60 |
| 5,513,375 | 4/1996 | Peters ................... 395/846 |

OTHER PUBLICATIONS

"An Overview of Functional Multiprocessing for NFS Network SErvices (Auspex Technical Report 1)", published by Auspex, Ltd. in USA, pp. 6–13.

"Enterprise Systems Architecture/390 Principles of Operation (SA22-7201-00)" published by IMB, ltd. in USA, chapters 5 and 15.

"Function and Structure of MVS" published by Modern Science, Ltd., chapter 5, pp. 130–131, 138–139. (This document provided in Japanese with no English translation).

Primary Examiner—Alyssa H. Bowler
Assistant Examiner—Dzung C. Nguyen

[57] ABSTRACT

A data processor transfers files at high speeds from a magnetic disk or other storage media to a network and shortens the processing time for the file transfers. An I/O processor includes (i) a channel to which a magnetic disk is connected, (ii) a LAN adapter to which a network is connected, (iii) a switch for switching and connecting the channel and LAN adapter, and (iv) a channel controller for controlling the channel, the LAN adapter, and the switch. The channel controller controls the channel, the LAN adapter, and the switch in accordance with a data transfer start instruction from an instruction processor. The channel reads data from the magnetic disk and transfers it to the LAN adapter via the switch. The LAN adapter sends the data to the network or reads data from the network and transfers it to the channel via the switch. The channel sends the data to the magnetic disk.

12 Claims, 10 Drawing Sheets

PRIOR ART

| | CONVENTIONAL SYSTEM | PRESENT INVENTION |
|---|---|---|
| NUMBER OF TIMES OF DATA MOVEMEMT | 4 TIMES | 3 TIMES |
| NUMBER OF TIMES OF INTERRUPTIONS TO THE HOST COMPUTER | 2 TIMES | 1 TIME |

FIG. 12

COMPUTER SYSTEM WITH AN INPUT/OUTPUT PROCESSOR WHICH ENABLES DIRECT FILE TRANSFERS BETWEEN A STORAGE MEDIUM AND A NETWORK

BACKGROUND OF THE INVENTION

The present invention relates to a file server for managing a file shared between a plurality of computers connected with a network and particularly to a file server using a computer system having an I/O processor connected to a magnetic disk with a channel.

Recently, a so-called distributed computing system in which a process which is executed conventionally by one system such as a main frame is distributed and processed by a plurality of computers connected with a network is coming into wide use. In this form, one or a small number of file servers are generally mounted within a network and it is necessary to satisfy requests such as a bulk disk and high access traffic, so that it may be considered that a main frame is used as a server.

When a file existing on a disk connected to a main frame (hereinafter, abbreviated to an ME) is transferred to a work station (hereinafter, abbreviated to a WS) connected with a network, the following system is used conventionally.

Figure 2:
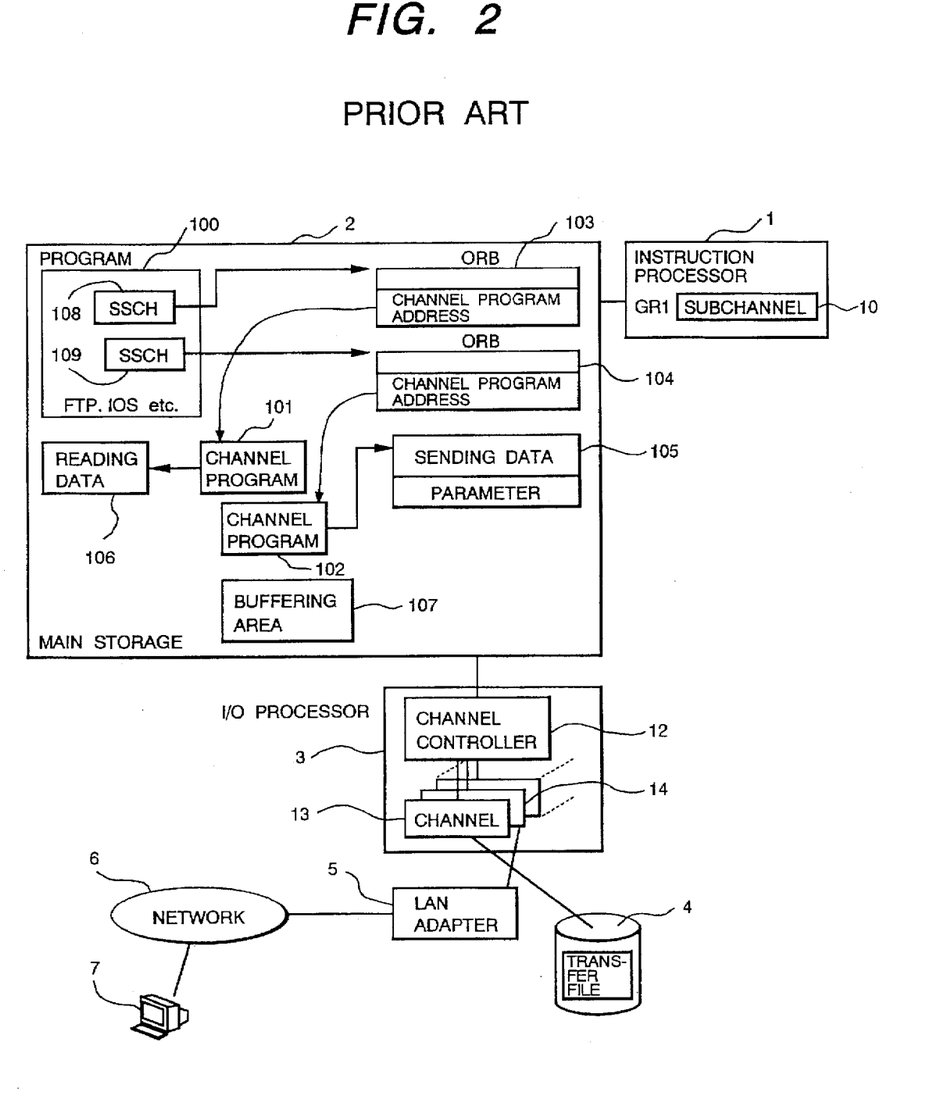
FIG. 2 is a drawing illustrating the prior art.

FIG. 2 shows a conventional constitution of a file server using an MF.

The MF comprises an instruction processor 1, a main storage 2, and an I/O processor 3. A shared file is stored on a magnetic disk 4 connected by a channel 13.

On the other hand, a channel 14 is connected to a LAN adapter 5 and can communicate with a WS 7 via a network 6. When a file is transferred between computers via the network, a TCP/IP (transmission control protocol/internet protocol) and an FTP (file transfer protocol) which is a standard procedure when a file is transferred between computers are generally used. A case in which these protocols are used will be explained hereunder.

The procedure for sending a file from the MF to the WS 7 is as shown below.

A program 100 on the MF divides the file into units which can be sent and executes three procedures such as (1) a file reading process from the magnetic disk 4 to the main storage 2, (2) an FTP process, and (3) a file sending process from the main storage 4 via the LAN adapter 5 to the WS 7 per every unit.

(1) Magnetic Disk→Main Storage

The program 100 starts the reading process from the magnetic disk 4 using a general purpose register GR1 10 in the instruction processor, a start subchannel (SSCH) instruction 108, an operation request block (ORB) 103, and a channel program 101.

The channel program 101 is executed by the channel 13 selected by a channel controller 12, and the data is loaded into an area 106 designated in the channel program 101, and the process is completed.

(2) FTP process

The program 100 copies the data read in the area 106 into a buffering area 107 and executes a process necessary for the FTP. When the process is completed, the program 100 copies the data into a sending data area 105 and starts (3) the sending process.

(3) Main Storage→LAN Adapter→WS

The program 100 starts, as in (1), the data sending process to the LAN adapter using the GR1 10, an SSCH instruction 109, an ORB 104, and a channel program 102.

The channel 14 selected by the channel controller 12 transfers the parameter and data in the area 105 indicated by the channel program 102 to the LAN adapter 5. The transferred data is subjected to a necessary process (for example, the TCP/IP process) by the LAN adapter and is sent to the network 6.

When the processes (1), (2), and (3) are repeated, files on the magnetic disk 4 are transferred to the WS 7.

The SSCH instruction, ORB, and channel program appearing in the above description are explained in detail in Chapters 14 and 15 of "Enterprise Systems Architecture/390 Principles of Operation (SA22-7201-00)" published by IBM, Ltd. in U.S.A. The aforementioned art has an advantage that an I/O processor of the MF can be produced simply for various purposes in respect of that a LAN adapter connected with a channel is used. However, a problem arises that since data on a magnetic disk is transferred to the main storage of the MF once and then transferred to the LAN adapter, processes on the MF side such as an interruption process and data movement are a bottleneck and even if the network connecting the MF and WS operates at high speed, the high speed cannot be utilized fully.

As a method for solving such a problem, a functional multiprocessing system is described in "An Overview of Functional Multiprocessing for NFS Network Servers (Auspex Technical Report 1)" published by Auspex, Ltd. in U.S.A.

In this system, the server has a host computer including a Unix work station (Unix: Registered trademark of UNIX System Laboratory, Inc.) as a parent as well as a plurality of processors for executing each of the processes such as access to a magnetic disk connected to the work station with a bus, file management, transfer protocol process and transfers data from the magnetic disk to the network by the processors not through the main storage of the host computer. However, in the functional multiprocessing system which transfers data not through the main storage of the host computer, problems arise that since processes for communication between the processors having distributed functions occur frequently, the processing time for file transfer becomes longer and since the processors are connected with buses, when a large amount of data is transferred, the busy rate increases and sufficient performance cannot be obtained.

SUMMARY OF THE INVENTION

An object of the present invention is to enable file transfer at high speed from a magnetic disk to a network and shorten the processing time for file transfer.

Another object of the present invention is to obtain sufficient performance for transfer of a large amount of data.

According to the present invention, in an data processor including an instruction processor, a main storage, a peripheral equipment, and an I/O processor connected to a network, the channel controller mounted in the I/O processor controls the channel unit, the adapter unit, and the switching means according to a data transfer start instruction of the instruction processor, and the channel unit reads data from the peripheral equipment and transfers it to the adapter unit via the switching means, and the adapter unit sends the data to the network or the adapter unit reads data from the network and transfers it to the channel unit via the switching means, and the channel unit sends the data to the peripheral equipment.

The instruction processor executes a data transfer start instruction for designating the channel unit and the adapter unit at the same time and the channel controller has a means of outputting a data transfer start instruction for starting the channel unit and the adapter unit at the same time.

The channel unit has a means of switching an i/O destination of the data buffer in the channel between the main storage and the switching means according to designation from the channel controller.

According to the present invention, the instruction processor starts the processing for the adapter and peripheral equipment once. The channel controller selects a channel unit connected to the peripheral equipment and controls the switching means so as to connect the adapter unit to the channel unit. The channel unit controls the selector by the micro program and connects the data buffer to the switching means. When the channel program is executed, the data which is loaded from the peripheral equipment into the data buffer in the channel is transferred to the local memory of the adapter unit via the switching means and transferred to the network after a necessary process is executed for it. Data is transferred to the peripheral equipment from the network in the same way.

By doing this, a file can be transferred to the network from the peripheral equipment at high speed, and the time required for file transfer can be shortened, and sufficient performance can be obtained for transfer of a large amount of data.

DESCRIPTION OF THE PREFERRED EMBODIMENTS

The embodiment of the present invention will be explained hereunder with reference to FIGS. 1 and 3 to 6. In this embodiment, a case in which a file is transferred from an MF to a WS by an FTP will be described.

Figure 1:
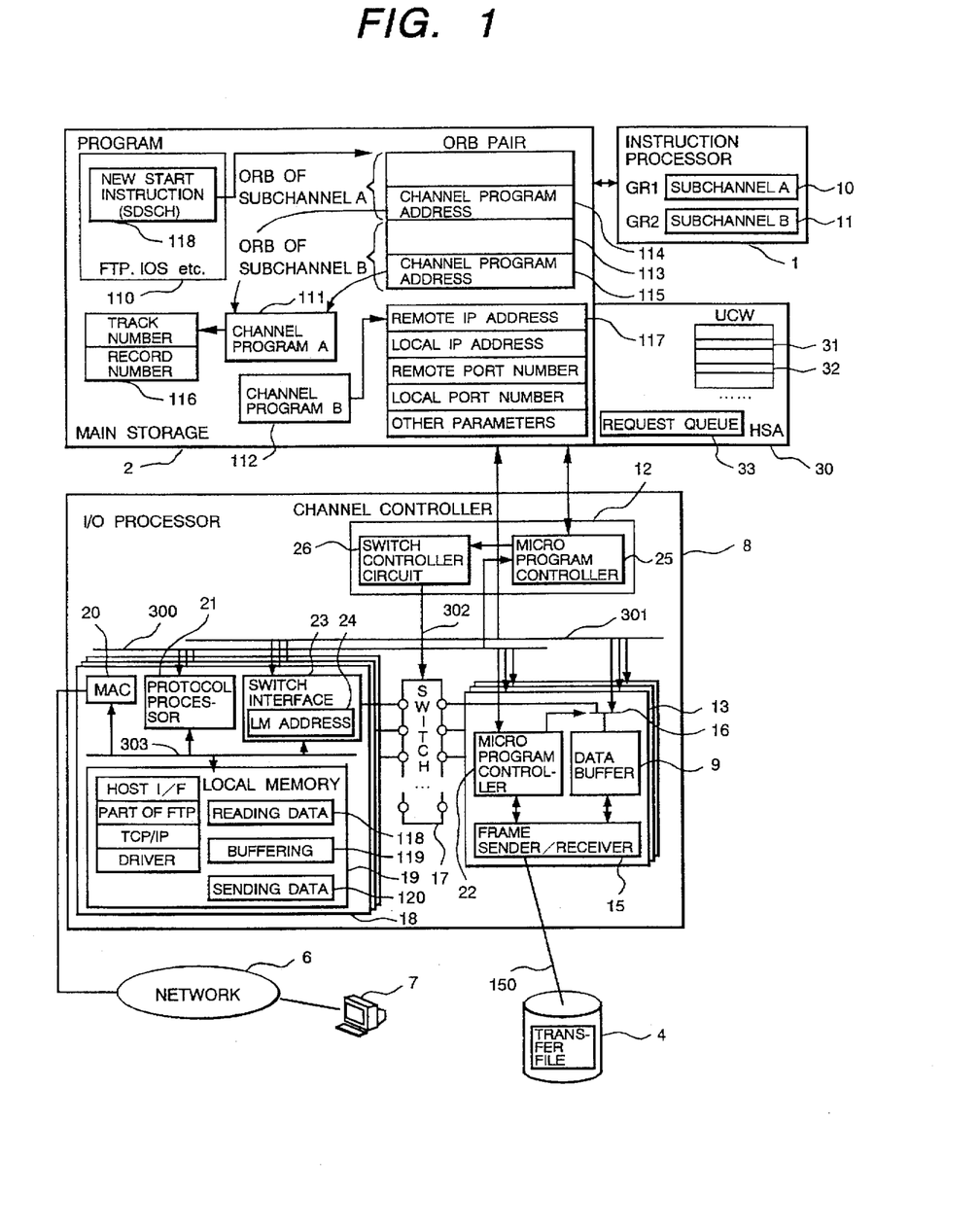
FIG. 1 is a drawing showing the basic constitution of an embodiment of the present invention.

FIG. 1 is a basic block diagram of the present invention. The MF comprises an instruction processor 1, a main storage 2, and an I/O processor 8.

A magnetic disk 4 is connected to the MF via a channel 13 and a WS 7 is connected to the MF via a network 6.

The I/O processor 8 comprises a channel controller 12, a plurality of (for example, 32) channels, a plurality of LAN adapters 18, a switch 17, and a bus.

The channel 13 comprises a data buffer 9, a micro program controller 22, and a frame sender/receiver 15. The frame sender/receiver 15 takes charge of assembling, sending/receiving, and disassembling of a frame transmitted on an optical fiber 150.

Each LAN adapter 18 comprises a protocol processor 21, an MAC (media access control) layer processor 20 for controlling an interface intrinsic to the LAN, a switch interface 23, and a local memory 19. In the LAN adapter 18, a part of the FTP process and the TCP/IP process are executed by the protocol processor 21.

Firstly, when a packet of FTP get (file loading from the MF into the WS) request is sent from the WS 7, it is loaded into the local memory 19 of the LAN adapter 18 by the MAC processor 20. The loaded packet is transferred to the main storage 2 of the MF by the protocol processor 21 via a data bus 301 and the channel controller 12.

To inform a program 110 of arrival of the packet, a micro program controller 25 of the channel controller 12 causes an interruption in the instruction processor 1. By doing this, the program 110 informed of arrival of the packet analyzes the content of the received packet, recognizes that it is an FTP get request, and then starts a file sending process. It is executed as described below.

The program 110 generates a channel program A 111 to be executed by the channel 13, a channel program B 112 to be executed by the LAN adapter 18, and an ORB pair 113 for storing the top addresses of these channel programs.

Only one channel program or ORB is conventionally designated per every SSCH instruction. According to the present invention, however, since both of the magnetic disk 4 and the LAN adapter 18 are started, it is necessary to designate two each respectively.

For each channel program, a command to be executed and a parameter necessary for it are designated.

For example, when data is read from the magnetic disk, a SEEK/SEARCH command for positioning the head and a READ DATA command for reading records are generally designated. When data is sent from the LAN adapter, a command such as PUT DATA is used. As parameters in this case, an IP address (described as a remote IP address in FIG. 1) of a transfer destination, a TCP port number (described as a remote port number in FIG. 1), a self IP address (described as a local IP address in FIG. 1), and a TCP port number (described as a local port number in FIG. 1) are designated.

The ORB pair 113 comprises an ORB for the channel and an ORB for the LAN adapter and the ORBs store top addresses 114 and 115 of the channel programs respectively.

Figure 3:
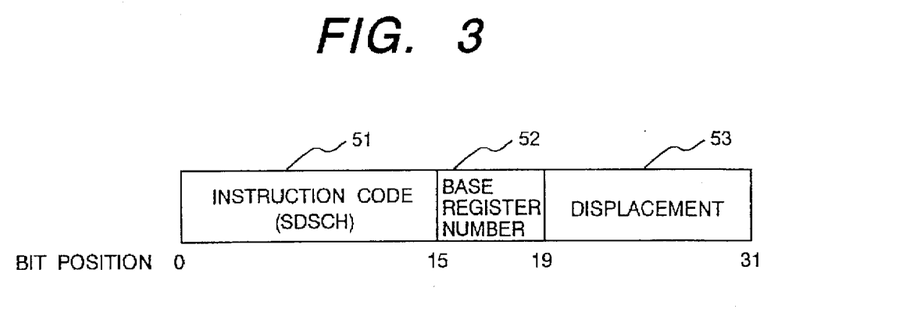
FIG. 3 is a drawing showing the format of a START DOUBLE SUBCHANNEL instruction.

To start the channel 13 and the LAN adapter 18, the program 110 uses a START DOUBLE SUBCHANNEL (SDSCH) instruction 118 which is provided newly in the present invention as a data transfer start instruction. The instruction format thereof is shown in FIG. 3.

The SDSCH instruction uses the S format described in Chapter 5 of "Enterprise Systems Architecture/390 Principles of Operation" mentioned above and comprises a 16-bit instruction code 51, a 4-bit base register number 52, and a 12-bit displacement 53.

A second operand address calculated by using the base register number 52 and the displacement 53 indicates the top address of the ORB pair 113 shown in FIG. 1.

Devices which are started by the SDSCH instruction 118 and subjected to an I/O process are stored in the GR1 10 and the GR2 11 of the instruction processor 1 as a subchannel number respectively.

When the SDSCH instruction 118 is issued from the program 110, the instruction processor 1 interpreting the SDSCH instruction 118 stores the top addresses of the channel program A and the channel program B on the ORB pair in the predetermined area of the main storage 2 which is decided beforehand between the instruction processor 1 and the channel 12 and informs the micro program controller 25 of the channel controller 12 of it and the channel 13 connected to the magnetic disk 4 corresponding to the subchannel number designated by the GR1 10 of the instruction processor 1 and the LAN adapter equivalent to the subchannel number designated by the GR2 11 are selected by the micro program controller 25 of the channel controller 12.

The micro program controller 25 of the channel controller 12 starts the micro program controller 22 of the channel 13 and the protocol processor 21 of the LAN adapter 18 using a control bus 300.

At the same time, the micro program controller 25 designates a switch controller circuit 26 to connect the channel 13 and the LAN adapter 18 and the switch controller circuit 26 controls the switch 17 via a line 302 so as to establish connection between the channel 13 and the LAN adapter 18. The channel 13 and the LAN adapter 18 which are started access the aforementioned predetermined area, read the top addresses of the channel programs, access the top addresses, and read the channel programs.

The protocol processor 21 sets the address in the local memory 19 where data transferred from the channel 13 is stored in a local memory address register 24 in the switch interface 23 and informs the micro program controller 22 of the channel 13 of "ready" via the control bus 300.

The channel 13 informed loads a file from the magnetic disk 4 into the data buffer 9 under control of the micro program controller 22. The position of the data to be read on the disk is designated as a track number and a record number in an area 116 in the main storage 2 of the MF indicated in the channel program 111.

The data buffer 9 in the channel 13 can switch the I/O destination between the channel controller 12 and the switch 17 by the selector 16. When data on the magnetic disk 4 is to be transferred to the main storage 2, the former is selected by the micro program controller 22. When it is to be transferred to the LAN adapter, the latter is selected. In this case, the selector 16 selects the transfer bus to the switch 17 and data loaded into the data buffer 9 is transferred to the switch interface unit 23 in the LAN adapter 18 via the switch 17.

The switch interface unit 23 transfers the data to an area 118 in the local memory 19 designated in the local memory address register 24 via an internal bus 303 in the LAN adapter 18.

The protocol processor 21 copies the transferred data into a buffering area 119 and executes a part of the FTP process here. When the execution is completed, the protocol processor 21 copies the data into a sending area 120, executes the TCP/IP process here, then transfers the data to the MAC layer processor 20, and sends it to the network 6 after a process intrinsic to the LAN 6 is executed.

At the point of time when all the data is transferred to the LAN adapter 18 normally, the channel 13 reports the end of processing to the micro program controller 25 of the channel controller 12.

At the point of time when the data transfer by the MAC layer processor 20 all terminates normally and a normal reception report is returned from the WS 7, the protocol processor 21 reports the end to the micro program controller 25 of the channel controller 12 via the control bus 300.

At the point of time when the micro program controller 25 of the channel controller 12 receives both the end reports from the channel 13 and the LAN adapter 18, it issues an I/O process end interruption request to the instruction processor 1.

Next, the aforementioned operations will be explained in detail with reference to FIGS. 7 to 12.

Figure 7:
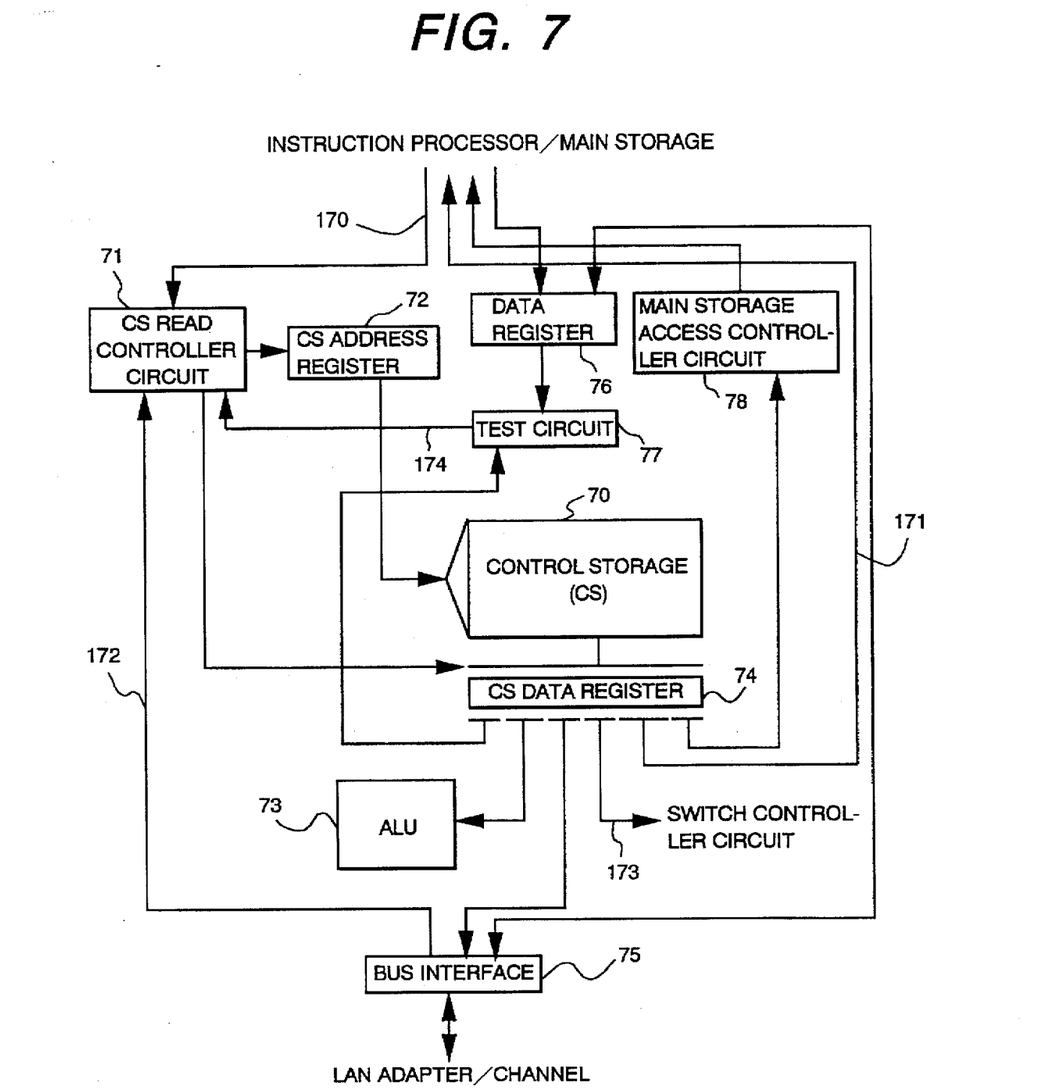
FIG. 7 is a drawing showing the constitution of a micro program controller in a channel controller.
Figure 8:
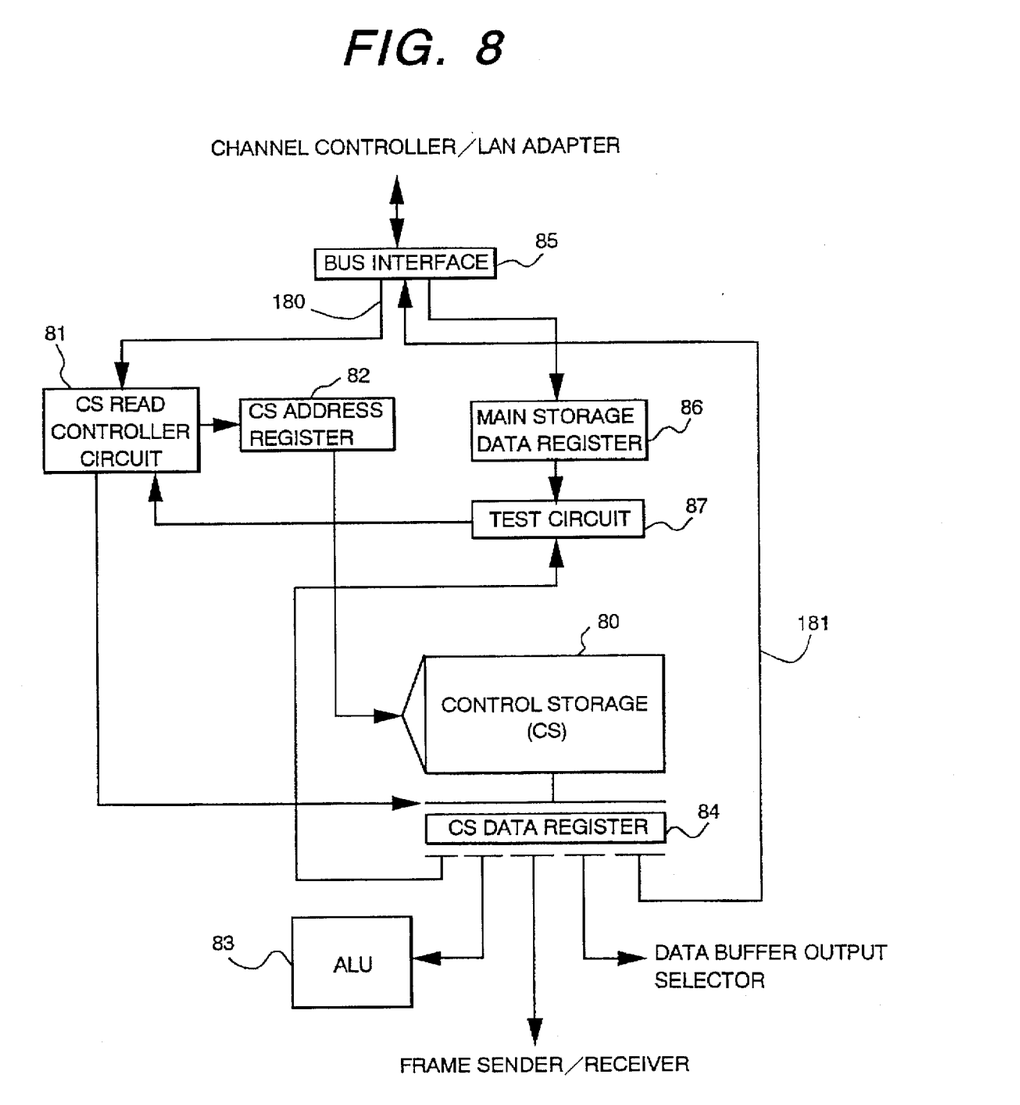
FIG. 8 is a drawing showing the constitution of a micro program controller in a channel.

Firstly, the internal constitutions of the micro program controller 25 of the channel controller 12 and the micro program controller 22 of the channel 13 will be explained with reference to FIG. 7 showing the micro program controller 25 and FIG. 8 showing the micro program controller 22.

The micro program controller 25 of the channel controller 12 shown in FIG. 7 comprises a control storage (hereinafter abbreviated to a CS) 70, a CS read controller circuit 71, a CS address register 72, a CS data register 74, an ALU 73, a bus interface 75, a data register 76, a test circuit 77, and a main storage access controller circuit 78.

The CS 70 stores micro programs and they are read under control of the CS read controller circuit 71. The address at this time is designated by the CS address register 72.

A micro program read by the CS 70 is set in the CS data register 74 and controls the operations of the ALU 73, the bus interface 75, the switch controller circuit 26, the test circuit 77, and the main storage access controller circuit 78 according to designation of each field and transfers information to the instruction processor 1 and the main storage 2 via a line 171.

The data register 76 stores data from the main storage 2, the channel, and the LAN adapter, and the micro program can test the value by the test circuit 77, and the result is reflected to the CS read controller circuit 71 via a line 174.

The CS read controller circuit 71 receives a signal from the instruction processor 1 via a line 170 in addition to the line 174 and a signal from the LAN adapter or the channel via a line 172 and controls so as to read a necessary micro program.

The micro program controller 22 of the channel 13 shown in FIG. 8 comprises a CS 80, a CS read controller circuit 81, a CS address register 82, a CS data register 84, an ALU 83, a bus interface 85, a data register 86, and a test circuit 87. The CS 80 stores micro programs and they are read under control of the CS read controller circuit 81. The address at this time is designated by the CS address register 82.

A micro program read by the CS 80 is set in the CS data register 84 and controls the operations of the ALU 83, the bus interface 85, the frame sender/receiver 15, and the data buffer output selector 16 according to designation of each field and transfers information to the channel controller 12 and the LAN adapter via a line 181 and the bus interface 85. The CS read controller circuit 81 receives a signal from the the channel controller 12 and the LAN adapter via a line 180 and controls so as to read a necessary micro program.

FIGS. 9 to 12 show flows of detailed operations in this embodiment.

Figure 9:
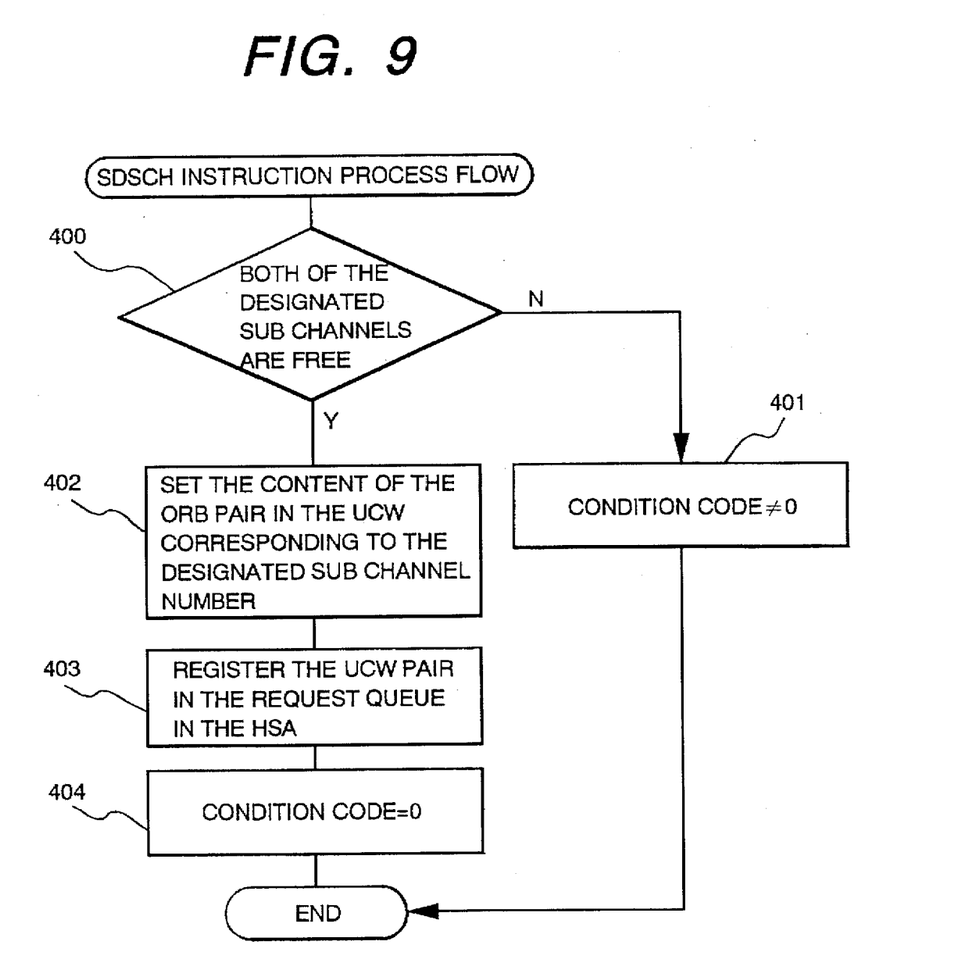
FIG. 9 is a drawing showing the flow of processing of an SDSCH instruction of an instruction processor.

FIG. 9 shows the process of an SDSCH instruction executed by a micro program of an instruction processor.

When the SDSCH instruction is issued from a program executed by the instruction processor; whether both of the designated subchannels are free or not is checked first (400).

When at least one of them is in use, a condition code other than 0 is set and the process ends (401).

Otherwise, the content of the ORB pair 113 is set in unit control words (hereinafter abbreviated to UCWs) 31 and 32 (see FIG. 1) corresponding to the two designated subchannel numbers respectively UCWs 31 and 32 are stored in a hardware system area (hereinafter abbreviated to an HSA) 30 (see FIG. 1) which is a part of the main storage 2.

When the content of the ORB pair 113 is set, the UCW pair is also registered in a request queue 33 (see FIG. 1) in the HSA 30 next (403).

By doing this, the process request to the IOP 8 from the instruction processor 1 is completed, the condition code is set to 0 and the instruction process ends (404).

The condition code mentioned above is the same as that in the aforementioned SSCH instruction and it is well known.

Figure 10:
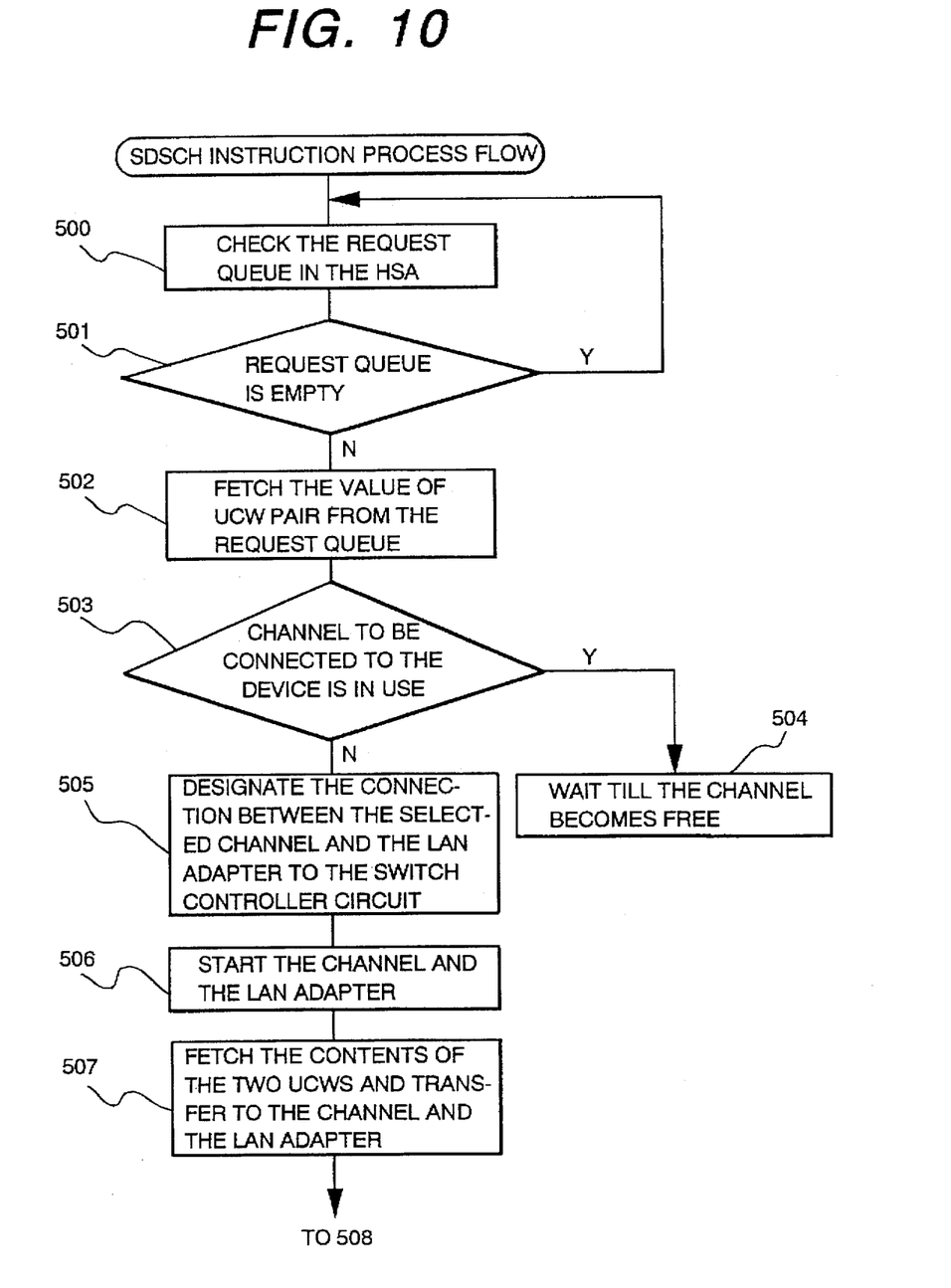
FIG. 10 is a drawing showing a part of the flow of processing of an SDSCH instruction of a micro program controller of a channel controller.
Figure 11:
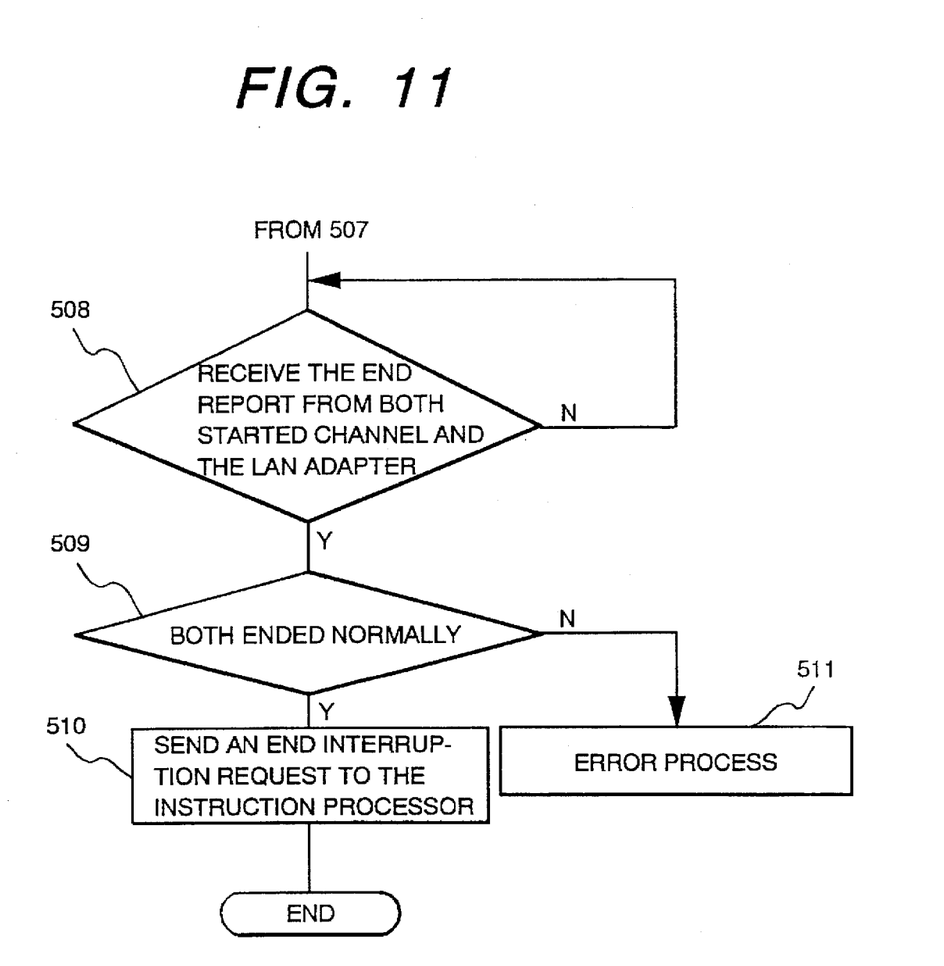
FIG. 11 is a drawing showing the part of the flow of processing of the SDSCH instruction of the micro program controller of the channel controller which follows FIG. 10.

FIGS. 10 and 11 show the process of the SDSCH instruction which is executed by the micro program in the micro program controller 25 of the channel controller 12 shown in FIG. 7. In the micro program controller 25, a micro program always checks the request queue 33 in the HSA 30 (500) and loops as long as the request queue 33 is empty (501). It is made possible when the micro program controller 25 controls the main storage access controller circuit 78 so as to access the request queue 33 from the HSA 30, loads the corresponding information into the data register 76, tests the content thereof by the test circuit 77, and reflects the result to the CS read controller circuit 71.

When the request queue 33 is not empty, the micro program controller 25 fetches the two UCW numbers from the request queue 33 (502) and checks whether the channel to be connected to the designated disk is in use (503). It can be known by inquiring the channel via the bus interface 75. When the channel is in use, the micro program controller 25 waits till the channel becomes free as conventional (504).

When the channel is not in use, the micro program controller 25 designates a connection between the selected channel 13 and the LAN adapter to the switch controller circuit 26 via a line 173 (505).

The micro program controller 25 informs the channel 13 and the LAN adapter 18 of start via the bus interface 75 (506). Thereafter, the micro program controller 25 checks the contents of the two UCWs 31 and 32 and transfers them to the channel 13 and the LAN adapter 18 (507).

By doing this, the channel 13 and the LAN adapter 18 start the processes, so that the micro program controller 25 waits until it receives end reports from the two (508).

When the micro program controller 25 receives the end reports from the two and it is found out from them that the test with the two by the test circuit 77 ends normally (509), the micro program controller 25 issues an end interruption request to the instruction processor (510). When the test does not end normally, the micro program controller 25 starts an error process (511).

Figure 12:
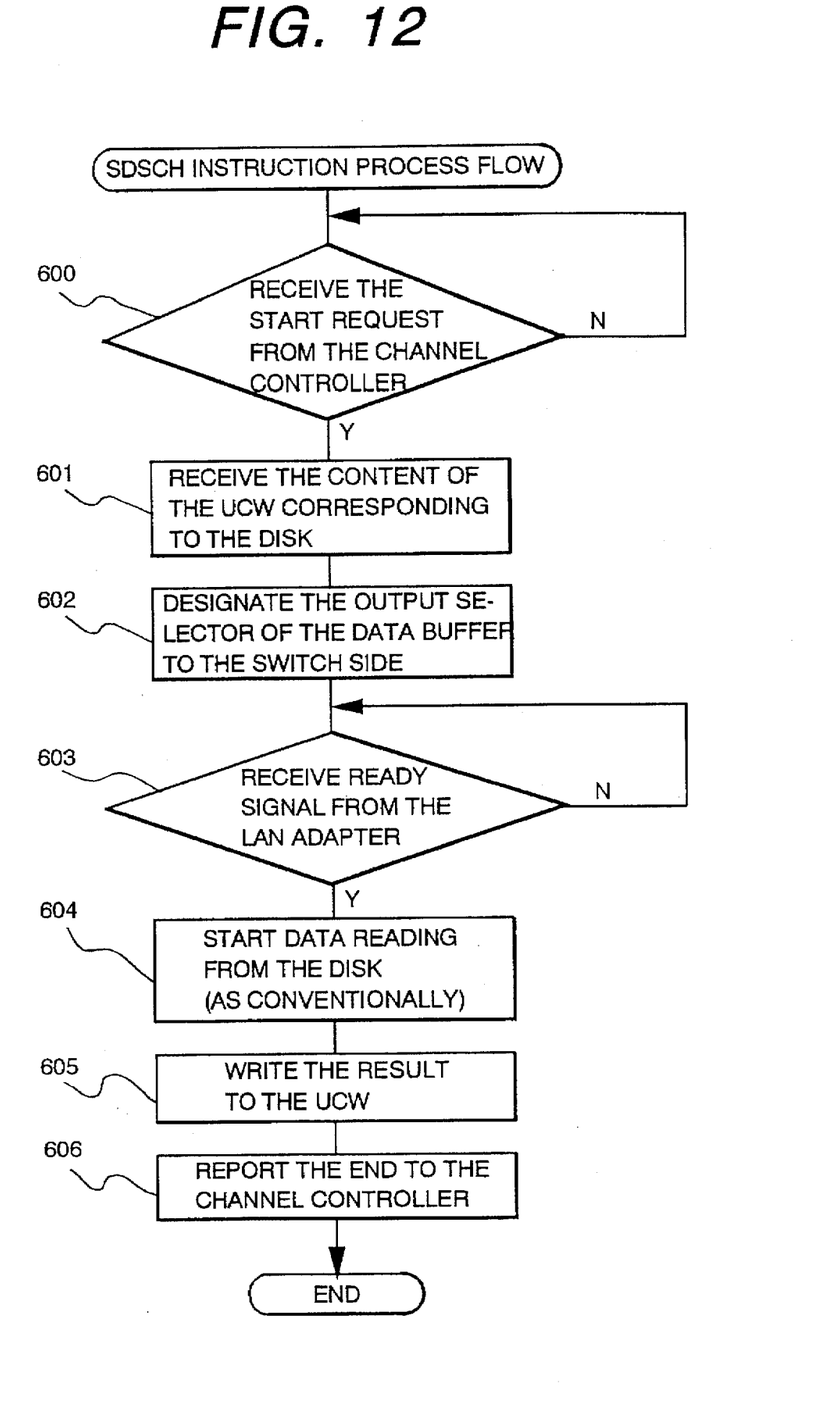
FIG. 12 is a drawing showing the flow of processing of an SDSCH instruction of a micro program controller of a channel.

FIG. 12 shows the process of the SDSCH instruction which is executed by the micro program in the micro program controller 22 of the channel controller 13 shown in FIG. 8. A micro program of the channel 13 loops and waits until it receives start information (600). It is made possible when the test circuit 87 tests the content of the data register 86 transferred from the channel controller 12 and the result is reflected to the CS read controller circuit 81.

When the micro program receives the start request from the channel controller 12, it receives the content of the UCW (31 or 32, whichever corresponds to the disk 4, 31 in this case) transferred from the channel controller 12 (601). Thereafter, the micro program controls and sets the output selector 16 of the data buffer 9 to the switch side (602).

Thereafter, the micro program waits for a ready signal from the LAN adapter 18 (603) and upon receipt of a ready signal, the micro program starts data reading from the disk 4 (604). The process at Step 604 is exactly the same as the conventional reading process from a disk.

When the reading process ends, the channel 13 writes the processing result in the UCW 31 (605), reports the end to the channel controller 12, and ends the process (606).

Now, the explanation of detailed operations of this embodiment ends.

Figure 5:
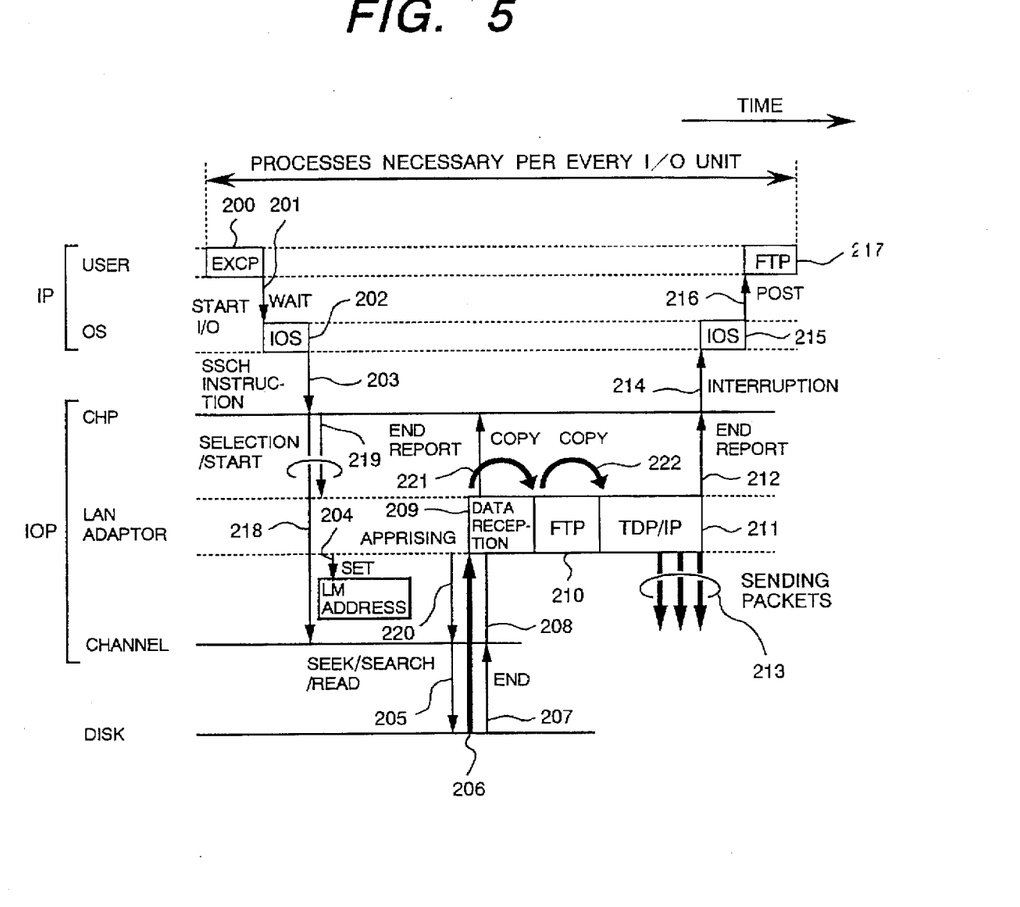
FIG. 5 is a drawing showing control and data flow in the file transfer of the present invention.

FIG. 5 shows control and data flow in the system of the present invention.

Software of the instruction process (IP) is generally classified into the user level and the system (OS) level depending on the operation mode.

When an EXCP (execute channel program) macro process 200 is executed in the user mode, a STARTIO macro process 201 is issued.

The STARTIO macro process 201 calls an IOS (input output supervisor) 202, makes a final preparation for the I/O process, and issues an SDSCH instruction 203.

The channel controller (CHP) receiving the SDSCH instruction 203 starts the LAN adapter and channel (218, 219).

The LAN adapter sets the local memory address (204) and informs the channel of completion of setting (220).

Upon receipt of it, the channel issues a series of commands such as SEEK, SEARCH, and READ to the magnetic disk (205), transfers data to the local memory of the LAN adapter (206), and reports the end to the channel controller (208) when it receives an END status (207).

On the other hand, the LAN adapter executes a reception process 209, an FTP process 210, and a TCP/IP process 211, sends data in a packet (213), and reports the end when the above is completed (212).

At this point of time, the channel controller requests an interruption to the instruction processor (214) and an IOS 215 operates and executes an interruption on the instruction processor receiving it and then starts an FTP process 217 waiting for an I/O process (216).

In the aforementioned processing, the drawing shows that except sending packets, data movement occurs three times (206, 221, 222) and an interruption occurs one time.

Figure 4:
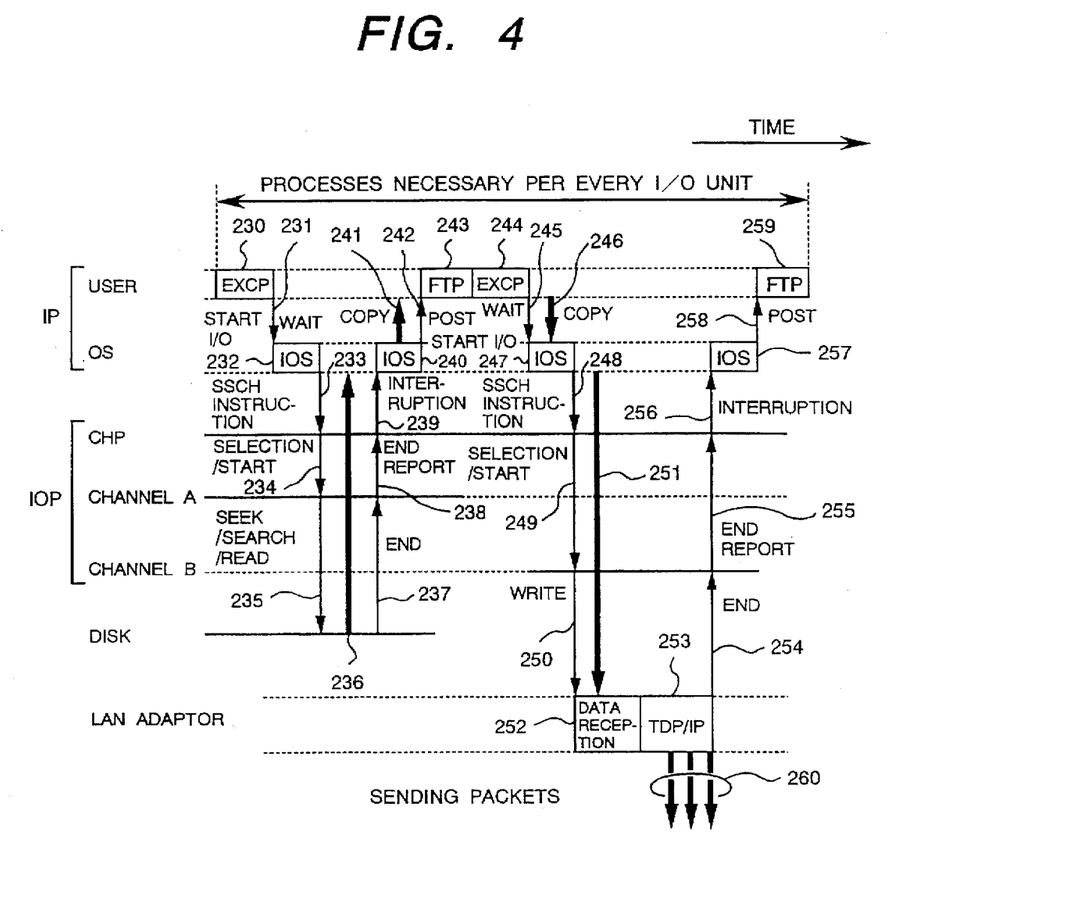
FIG. 4 is a drawing showing control and data flow in the conventional file transfer.

On the other hand, FIG. 4 shows control and data flow in a conventional system having the constitution shown in FIG. 2.

An EXCP macro process 230 in the user mode issues a STARTIO macro process (231) and starts an IOS 232.

The IOS 232 issues an SSCH instruction (233) and when the channel controller receiving it selects and starts the channel A, the channel A reads data from the magnetic disk by the SEEK, SEARCH, and READ commands and transfers it to the main storage of the MF (236).

When the channel A receives the END status after the transfer is completed (237), it reports the end (238) and the channel controller issues an interruption request (239). In the instruction processor, an IOS 240 operates, copies data (241), and starts an FTP process 243.

When the FTP process ends, an EXCP macro process 244 for starting the LAN adapter is executed, and a STARTIO macro process 245 and an IOS process 247 are executed, and data is copied (246), and an SSCH instruction is issued (248).

The channel B is selected and started by the SSCH instruction this time (249) and a necessary parameter and data are transferred to the LAN adapter by the WRITE command (251).

In the LAN adapter, the protocol processor executes a data reception process (252) and a TCP/IP process (253) and returns the END status to the channel B after a packet sending process (260) is completed (254).

The channel B reports the end to the channel controller (255) and the channel controller requests an interruption to the instruction processor (256).

When an IOS 257 started by the interruption executes an interruption, it restarts an FTP process 259 (258).

Now, the process per every transfer is completed.

In the convention system, except sending packets, four times of data movement and two times of interruptions are necessary.

The EXCP, IOS, and STARTIO macro processes appearing in the aforementioned description are described, for example, in Chapter 5 of "Function and Structure of MVS" published by Modern Science, Ltd.

Figure 6:
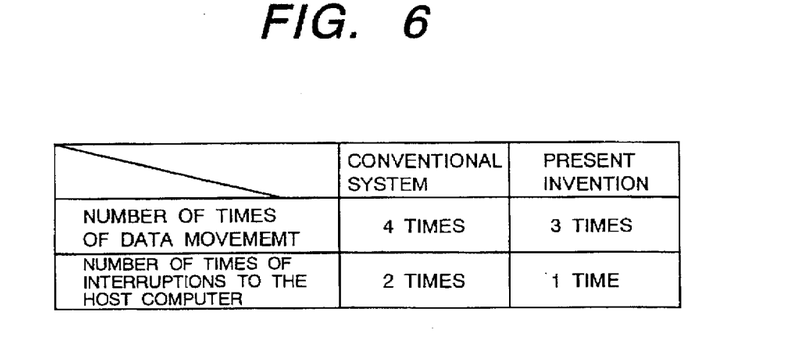
FIG. 6 is a drawing showing a comparison of the number of times of data movement and the number of times of interruptions between the present invention and the conventional system.

FIG. 6 shows a comparison of the number of times of data movement and the number of times of interruptions between the conventional system and the system of the present invention.

As mentioned above, in the conventional system, the number of times of data movement is 4 and the number of times of interruptions is 2, while in the system of the present invention, the number of times of data movement is 3 and the number of times of interruptions is 1 and both the numbers are reduced by one time respectively.

The aforementioned description relates to the FTP get process. In the case of the put (a file write process into the MF from the WS) process, when data received from the network 6 is subjected to the TCP/IPFTP process in the local memory 19 of the LAN adapter 18, and then the channel 13 is informed of it, and a write process into the magnetic disk 4 is executed, the put process can be realized in the same way as with the get process.

As mentioned above, according to the present invention, when data is transferred directly to the LAN adapter from the magnetic disk not via the main storage of the MFD which is a host computer, the number of times of data movement and the number of times of interruptions to the host computer are reduced, and a file can be transferred at high speed, and the time required for the file transfer process can be shorted.

When data is transferred directly to the LAN adapter from the magnetic disk via the switch but not via the main storage of the MFD, sufficient performance can be obtained for transfer of a large amount of data.

We claim:

1. A data processor comprising:
   (a) an instruction processor for executing a program,
   (b) a main storage for storing a program and data,
   (c) an I/O processor connected to a network and peripheral equipment, the I/O processor comprising:
      (c-1) at least one channel means to which said peripheral equipment is connected,
      (c-2) at least one adapter means to which said network is connected,
      (c-3) switch means for switching and connecting said channel means and said adapter means, and
      (c-4) channel control means for controlling said channel means, said adapter means, and said switch means in accordance with a data transfer start instruction from said instruction processor, said channel control means controlling said channel means to read data from said peripheral equipment and transfer it to said adapter means via said switch means and controlling said adapter means to (i) send said data to said network (ii) read data from said network and transfer it to said channel means via said switch means and controlling said channel means to send said data to said peripheral equipment, the data being transferred between said peripheral equipment and said network without passing through the instruction processor.

2. The data processor according to claim 1, wherein said instruction processor has means for (i) executing a data transfer start instruction for designating said channel means and said adapter means and (ii) outputting a data transfer start designation to said channel control means for starting said channel means and said adapter means.

3. The data processor according to claim 1, wherein said channel means has means for switching the I/O destination of the data buffer in the channel between said main storage and said switch means according to a designation from said channel control means.

4. A file server system for managing a file shared between a plurality of computers connected with a network, the file server system comprising:
   (a) an instruction processor for executing a program,
   (b) a main storage for storing a program and data,
   (c) an I/O processor connected with said network and a magnetic disk device, the I/O comprising:
      (c-1) at least one channel means to which said magnetic disk device is connected,
      (c-2) at least one adapter means to which said network is connected,
      (c-3) switch means for switching and connecting said channel means and said adapter means, and
      (c-4) channel control means for controlling said channel means, said adapter means, and said switch means to: (a) read data from said magnetic disk device via said channel means, transfer the read data to said adapter means via said switch means, and send the transferred data to said network or (b) read data from said network via said adapter means via said switch means, and send the transferred data to said magnetic disk device according to a data transfer start instruction of said instruction processor, the data being transferred between said magnetic disk device and said network without passing through the instruction processor.

5. The data processor according to claim 1, wherein the data is transferred between the peripheral equipment and the network without passing through the main storage.

6. The file server system according to claim 4, wherein the data is transferred between the magnetic disk device and the network without passing through the main storage.

7. A data processor comprising:
   (a) an instruction processor for executing a program;
   (b) a storage medium for storing a program and data;
   (c) an I/O processor connected with a network and peripheral equipment, the I/O processor comprising:
      (c-1) at least one unit with which the peripheral equipment is connected and which transfers data between the unit and the peripheral equipment, (c-2) at least one network adapter with which said network is connected, (c-3) a switch for switching and connecting the unit and the network adapter, and (c-4) a controller for controlling said unit, said network adapter, and said switch according to a data transfer start instruction executed by said instruction processor, said controller (i) controlling said unit to read data from said peripheral equipment and transfer it to said network adapter via said switch and controlling said network adapter to send said data to said network or said network without the data passing through the instruction processor or (ii) controlling said network adapter to read data from said network and transfer it to said unit via said switch and controlling said unit to send said data to said peripheral equipment without the data passing through the instruction processor.

8. The data processor according to claim 7, wherein said instruction processor executes a data transfer start instruction for designating said unit and said network adapter and outputs a data transfer start designation for starting said unit and said network adapter to said unit.

9. The data processor according to claim 7, wherein said unit switches the I/O destination of the data buffer in the unit between said storage and said switch according to a designation from said controller.

10. The data processor according to claim 7, wherein the data is transferred between the peripheral equipment and the network without passing through the storage medium.

11. A file server system for managing a file shared between a plurality of computers connected with a network, the file server system comprising:

(a) an instruction processor for executing a program;

(b) a storage for storing a program and data;

(c) an I/O processor connected with said network and a disk device for storing data, the I/O processor comprising:

(c-1) at least one unit with which said disk device is connected and which reads and writes data for said disk device, (c-2) at least one adapter with which said network is connected, (c-3) a switch for switching and connecting said unit and said adapter, and (c-4) a controller for controlling said unit, said adapter, and said switch so as to (a) read data from said disk device via said unit, transfer the read data to said adapter via said switch, and send the transferred data to said network, the data being transferred from said disk device to said network without passing through the instruction processor or (b) read data from said network via said adapter, transfer the read data to said unit via said switch, and send the transferred data to said disk device according to a data transfer start instruction executed by said instruction processor, the data being transferred from said network to said disk device without passing through the instruction processor.

12. The file server system according to claim 11, wherein the data is transferred between the disk device and the network without passing through the storage.

* * * * *